United States Patent Office
3,062,904
Patented Nov. 6, 1962

3,062,904
PRODUCTION OF AROMATIC HYDROCARBONS
Kenneth F. Koetitz, Concord, and Lloyd C. Fetterly, Oakland, Calif., assignors to Shell Oil Company, a corporation of Delaware
No Drawing. Filed Dec. 31, 1958, Ser. No. 784,061
9 Claims. (Cl. 260—668)

This invention relates to the production of methylaromatic hydrocarbons and more particularly to the production of such compounds which contain at least two alkyl radicals including at least one methyl radical. The invention relates more specifically to the production of methylaromatic hydrocarbons by a process including condensation of an alkylaromatic hydrocarbon with formaldehyde, treating the resulting product to remove contaminants, and subsequent hydrocracking of the treated condensation product.

A method for the production of methylated aromatic hydrocarbons by the hydrocracking or hydrogenolysis of diarylmethanes is described in U.S. Reissue Patent 24,579 to L. C. Fetterly. The catalysts suitable for use in this hydrocracking reaction are high melting compounds of the group VI–VIII metals having an atomic number of at least 24 and particularly the variable valence metals. Activated carbon is also a suitable catalyst. The diarylmethane compounds which are suitable for hydrocracking are, in general, preferable by the "alkylation" of the corresponding aryl compound with formaldehyde. For example, ditolylmethanes, dixylylmethanes and dipseudocumylmethanes can be prepared by reacting the corresponding aromatic monomer with formaldehyde in the presence of an acidic catalyst. Strong liquid acids are known to be suitable catalysts for this alkylation reaction. They may be modified by the addition of organic compounds, e.g., an alcohol such as methanol or ethanol.

The combination of the alkylation of an aromatic hydrocarbon with formaldehyde and the hydrocracking of the resulting product containing largely diarylmethanes provides a unified process for the methylation of the original aromatic hydrocarbon.

It has now been found that while in some cases alkylation of aromatic hydrocarbons with formaldehyde results, in a product which is readily hydrocracked by contact with a catalyst of the type mentioned without substantial deleterious effect on the catalyst, in other cases alkylation produces a product which contains contaminating components which cause a very rapid decline in the life of hydrocracking catalyst.

It is, therefore, a principal object of the present invention to provide an improved process for the production of methyl-substituted aromatic hydrocarbons. A further object is to provide an improved process for the production of methylated aromatic hydrocarbons by conversion of aromatics containing one less methyl group with formaldehyde and subsequent hydrocracking of the resulting diarylmethanes. It is a further specific object to provide a process of the type described in which the life of the hydrocracking catalyst is greatly extended.

The diarylmethane compounds, which may be represented by the formula Ar—CH$_2$—Ar', wherein the "Ar" groups are usually the same aryl radicals having the same empirical formulas, although they may be different position isomers and can be even different types of radicals, are cracked in the hydrocracking step of the invention to yield two substances, one an arylmethane (Ar—CH$_3$) and the other a corresponding aryl compound, Ar'H. The gross reaction can be represented by the equation $$\text{Ar—CH}_2\text{—Ar'} + \text{H}_2 = \text{ArCH}_3 + \text{Ar'H}$$

Thus, the net result of the reaction is the cleavage of a C—C bond between the methylene (—CH$_2$—) carbon and a carbon atom of one of the aromatic rings and a saturation with hydrogen of the two bond fragments.

In the preparation of diarylmethanes by alkylation of aromatic compounds with formaldehyde, particularly the alkylation of alkylaromatics, generally there will be produced more or less of further alkylation products thereof. Thus, some of the diarylmethane compound is converted into a triaryldimethane compound, a so-called "trimer," represented by $$\text{Ar—CH}_2\text{—Ar—CH}_2\text{—Ar}$$

These triaryldimethane (arylmethyldiarylmethane) compounds are also cracked in the same manner and under similar conditions to yield two molecules of methylaromatics and one molecule of the original aromatic. Even higher polymers are cracked similarly.

An examination of the equations for the reactions for (1) the formation of the dimer and (2) the cracking of the dimer, namely, (1) $\quad 2\text{ArH} + \text{CH}_2\text{O} = \text{ArCH}_2\text{Ar} + \text{H}_2\text{O}$ (2) $\quad \text{Ar—CH}_2\text{—Ar} + \text{H}_2 = \text{ArCH}_3 + \text{ArH}$ shows that the over-all result is the conversion of one mole of aromatic compound (ArH) to one mole of corresponding methylaromatic or arylmethane (ArCH$_3$) for each two moles of initial aromatic feed. However, one mole of the aromatic compound is produced in the second stage, which can be recycled to the first stage. Thus, the theoretical net consumption of aromatics is one mole for each mole of desired methylaromatic produced.

The earliest workers in the field used as catalyst for the reaction of aromatics with formaldehyde concentrated sulfuric acid modified by addition of large amounts of acetic acid to moderate the reaction and to suppress the formation of resinous compounds; see Baeyer, Ber. 6, 220 (1873).

British Patent No. 446,450 discloses an improved process in which ethanol is used as the diluting agent for sulfuric acid. Methanol has also been used as modifier for sulfuric acid.

A method for preparing ditolylmethanes by reacting toluene with para-formaldehyde in the presence of sulfuric acid of 70–80% concentration as catalyst, in which a mixture of para-formaldehyde and toluene is bubbled through a column of sulfuric acid, is described in U.S. 2,761,884.

A method for using solid acidic catalysts in the alkylation of aromatics with formaldehyde is described in U.S. Patent 2,850,545 to Fetterly et al.

It has now been found that, while under certain conditions and when using certain catalysts, the reaction product of aromatics with formaldehyde can be directly hydrocracked in accordance with the above equations without seriously affecting catalyst life, and while pure triaryldimethanes and even purified tetraaryltrimethanes can be hydrocracked over catalysts of the type described above without seriously affecting catalyst life, it is also true that when the reaction between aromatics and formaldehyde is carried out at relatively severe conditions employing a strong liquid acid catalyst, the reaction product contains a contaminating component which has not yet been identified but which has been found to seriously shorten the life of the hydrocracking catalyst, thus necessitating a special treatment of the reaction product prior to the hydrocracking step.

In accordance with the process of this invention an aromatics-formaldehyde condensation product produced in the presence of a strong liquid acid catalyst and consisting essentially of diarylmethanes and/or triaryldimethanes, which may also contain tetraaryltrimethanes, is treated with a porous solid adsorbent material to remove catalyst-contaminating substances therefrom and the so-treated material is then hydrocracked to produce a compound consisting of methylated aromatic feed and the original aromatic feed compound.

It has been found that even when employing relatively strong sulfuric acid as the catalyst a quite clean alkylation product can be produced by confining the alkylation reaction to relatively mild conditions, e.g., temperatures not above 135° C. On the other hand, at more severe conditions, e.g., at alkylation temperatures in the range from 143° C. to 160° C. or higher, especially at high aromatic conversion, e.g., as high as 60%, it was found that the total reaction product made a severe conditions caused extremely rapid degradation of the hydrocracking catalyst. It was also found that the degradation was not due, as had been originally supposed, to the higher polyarylpolymethane compounds, e.g., the triaryldimethanes, but was due to an unidentified contaminating component. Analyses of the high-boiling material in sulfuric acid condensation product have shown the presence of sulfonic acid-, ester- and carbonyl-groups. None of these have been definitely identified as the objectionable ingredient. However, it has been found that the contaminating component can be removed from the product by contacting the total product with an adsorptive solid.

It was also found that the product produced when carrying out the alkylation with solid acidic catalyst according to U.S. Patent 2,850,545, even at temperatures as high as 150° C., did not cause substantial deactivation of the hydrocracking catalyst.

Although methods are thus available for directly converting aromatics to corresponding diarylmethanes or higher condensation products with formaldehyde and hydrocracking the reaction products directly without resorting to the adsorbent treat of the present invention, it is in many cases economically preferable to employ a strong liquid mineral acid at relatively severe conditions in order to achieve a greater amount of production from a given amount of equipment. In such cases it becomes essential to apply the process of this invention in order to protect the hydrocracking catalyst.

It is desirable to provide for treatment of the alkylation product wherever strong liquid acid catalyst is employed, since there is a delicate borderline between mild conditions at which relatively clean product is made and severe conditions at which product containing substantial amounts of contaminants is produced. In a continuous operation, for example, temporary upsets may cause severe conditions to occur.

The alkylation step in the process of this invention is carried out by contacting aromatic hydrocarbons, and particularly an alkylaromatic, with formaldehyde in the presence of a strong liquid acid catalyst. The contact may be carried out in any suitable manner, in batch or continuous equipment. Continuous operation may include the continuous removal of water added to and formed in the reaction in vapor form and return of aromatics removed as part of the vapor stream.

The preferred catalysts in the alkylation step of this process contain aqueous or concentrated sulfuric acid of from 40% to 100% $H_2SO_4$. Concentrated sulfuric acid, e.g., 90 $H_2SO_4$ or higher, may be modified by the addition of substantial proportions of modifying compounds, e.g., up to 30% or 40% of a lower aliphatic alcohol or acid, e.g., methanol or ethanol or glacial acetic acid. Other strong liquid acids may be employed in place of sulfuric acid, e.g., phosphoric acid, toluenesulfonic acid, trichloroacetic acid or methanesulfonic acid.

The alkylation can be carried out at temperatures from 0° C. to 160° C. or higher, depending in part on the feed and catalyst employed. It is preferred to employ the highest temperature at which relatively clean product is produced. With concentrated sulfuric acid, temperatures from 100° C. to 135° C. are especially suitable.

The hydrocarbon feed to the alkylation step may be benzene, toluene, any one of the xylenes or a mixture of xylenes, any one of the trimethylbenzenes or a mixture thereof, or any one of the tetramethylbenzenes or a mixture thereof. Aromatics containing one or more larger alkyl groups, e.g., ethyl, n-propyl, isopropyl, n-butyl, isobutyl, tert-butyl, and so forth, may also serve as feed. Aromatics of different degrees of substitution may be alkylated in a single alkylation step, e.g., a mixture of xylene and pseudocumene may be alkylated.

The combination process of alkylation, treatment and hydrocracking is particularly adapted to the conversion of toluene to para-xylene; of any one or a mixture of xylenes to pseudocumene; and of pseudocumene to durene.

Formaldehyde is preferably added as formalin, i.e., a concentrated aqueous solution, but may also be added, for example, in the form of para-formaldehyde or trioxymethylene.

In the adsorbent treating step intermediate between alkylation and hydrocracking, one of a number of commercially available highly adsorbent materials is suitably employed. These include aluminum oxide and particularly activated alumina, bauxite, clays of the montmorillonite type, silica gel, and the like.

The contacting step may consist of percolating the charge vertically through a column of suitable adsorbent. If desired, the charge may be slurried in contact with the adsorbent or may be passed in countercurrent flow through a moving bed of adsorbent. Spent adsorbent may be at least partly regenerated by washing with a polar solvent such as acetone or by burning.

The contacting temperature may be in the range from that employed in the alkylation step up to 200° C. to 250° C. or more, or it may be lower, e.g., as low as 125° C. The pressure may be atmospheric, subatmospheric or superatmospheric. Pressures intermediate between those employed in the alkylation and hydrocracking steps are usually preferred.

The catalysts which may be employed in the hydrocracking step of the present invention are, in general, high-melting compounds of group VI–VIII metals having an atomic number of at least 24, particularly the variable valence metals and more particularly combinations of at least two of them. The dehydrogenating metal sulfides are a preferred class of hydrocracking catalysts, particularly the group VI metal sulfides as for example the sulfides of tungsten, molybdenum and chromium and the sulfides of metals of atomic number from 25 to 28. Composites of a metal sulfide from each of these groups are especially preferred. Particularly suitable catalysts are a tungsten-nickel-sulfide catalyst such as is utilized commercially for the dehydrogenation of methylcyclohexane to toluene and a catalyst consisting of the mixed sulfides of molybdenum and tungsten, per se, or supported on a porous base, such as alumina. Oxides, including mixed oxides of the above-mentioned metals, are also suitable catalysts and molybdenum oxide supported on alumina is particularly preferred in this group. Composites of oxides and sulfides of the catalyst may also be suitably employed. Activated carbon has also been found to be a suitable hydrocracking catalyst.

Hydrocracking is readily effected by passing the treated alkylation reaction product together with hydrogen over heated catalysts of the above-described type at a sufficiently elevated temperature and at a suitable pressure. A broad range of mole ratios of hydrogen to alkylate can be utilized. In general a ratio in the range from about 1:1 to about 20:1 is suitable; a ratio of from about 2:1 to 10:1 and particularly about 4:1 or 5:1 gives especially satisfactory results. The temperature in the reaction zone may be between 350° C. and 480° C., and is preferably maintained at about 400° C.–450° C. Pressures ranging from atmospheric pressure to 3,000 p.s.i.g. or higher may be employed. A particularly suitable pressure range is between 100 and 1,000 p.s.i.g. and preferably from 200 to 600 p.s.i.g. A contact time corresponding to a liquid hourly space velocity (LHVS) of about 5 v./v./hr. has been found to be very effective although the space velocity may range from a value as low as about 1 to as high as about 20. The optimum set of conditions will depend on a number of variable factors including the particular catalyst employed, the particular alkylate feed, and whether it is a single compound or a mixture of polymers, the particular apparatus employed, and the like.

The hydrocracking reaction can suitably be carried out by passing the alkylate and hydrogen over or through a fixed bed or mass of the hydrocracking catalyst in particulate form, such as a bed of pellets or a packed section thereof in a confined reaction zone. The reaction can also be readily carried out by passing the preheated mixture or alkylate and hydrogen through a fluidized catalyst mass and the temperature of the catalyst mass can be readily controlled by any suitable means such as by providing heat transfer tubes disposed in the catalyst zone or by cycling a portion of the catalyst to an external heat exchanger and back to the reaction zone.

In the over-all process, a suitable aromatic feed and formaldehyde are contacted at relatively severe conditions with a strong liquid acid catalyst. The hydrocarbon phase of the reaction mixture is recovered separately. This usually contains unreacted aromatic monomer as well as diarylmethane, some triaryldimethane and perhaps some tetraaryltrimethane, and heavy contaminants of the type mentioned. Although the monomer may be recovered for re-use by flashing it is preferred to treat the product containing a substantial proportion of monomer, e.g., from 5 to 50% by volume. The product is treated by contact with a porous adsorbent, e.g., activated alumina, and the treated product is passed to contact with hydrocracking catalyst, e.g., a nickel-tungsten-sulfide catalyst, at hydrocracking conditions. Here, also, it is preferred to retain a portion of aromatic monomer in the hydrocracking charge stock. The hydrocracked product is fractionated to recover aromatic monomer for recycle to the alkylation step and methylated aromatic monomer as product of the process.

In a modification of the process, the adsorbent vessel is in direct communication with the hydrocracking vessel, and the condensation product is admixed with hydrogen and passed through the adsorbent in mixed phase or vapor phase and the effluent directly passed to the hydrocracking reaction zone.

The process of the invention is illustrated by the following examples which, however, are not to be construed as limiting this invention.

EXAMPLE I

Toluene was alkylated with formaldehyde at conditions and with results summarized in Table 1.

*Table 1*

| | |
|---|---|
| Temperature | 90° C.–100° C. |
| Pressure | Atmospheric |
| Catalyst composition, percent w.: | |
| $H_2SO_4$ | 63 |
| $CH_3OH$ | 20 |
| $H_2O$ | 17 |
| Product distribution, percent w.: | |
| Dimer | 81 |
| Trimer | 14.4 |
| Higher mol wt. | 4.6 |
| Yield based on toluene | 96.9% m. |
| Yield based on formaldehyde | 96.4% m. |
| Reaction time | 20 minutes |
| Conversion of toluene | 45% w. |

The alkylate, prepared as described, was subjected to a flash distillation to remove unconverted toluene. A portion of it was treated by passing it through a bed of activated alumina. Another part was redistilled and substantially pure ditolylmethane was recovered therefrom. Each portion was then separately hydrocracked by passing it over freshly-regenerated tungsten-nickel-sulfide catalyst at 400° C. and 500 p.s.i.g. The observed rates of deactivation of the catalyst, as evidenced by a drop in hydrocarbon conversion, were as follows: (1) Ditolylmethane—3.6%/vol. of product; (2) Treated alkylate—5.8%/vol. of product, however, during the second half of the run the rate was only 2%/vol. of product; (3) Untreated alkylate—12–13%/vol. of product.

EXAMPLE II

Three alkylates were prepared, two with liquid sulfuric acid in a continuous system, one at 132° C. and the other at 145° C.–155° C., and one batch-wise with 1% sulfuric acid on silica gel as catalyst. The method of preparation and composition of the alkylates are shown in Table 2.

*Table 2*

| Catalyst | T, ° C. | Acid, Aromatics, Vol. Ratio | Acid Strength | Conversion Aromatics, percent | Alkylate Composition, $C_9$-free percent | | |
|---|---|---|---|---|---|---|---|
| | | | | | Dimer | Trimer | Heavy Ends[a] |
| Liquid $H_2SO_4$ | 145–155 | 1/5 | 66–71% w. | 40–60 | 72.2 | 19.6 | 8.2 |
| Liquid $H_2SO_4$ | 132 | 5/1 | 60–62% w. | 28–32 | 89.5 | 7.1 | 3.0 |
| Silica gel $H_2SO_4$ | 145–150 | | 1% w. silica | 40 | 91.7 | 7.6 | 0.7 |

[a] Boiling >300° C. at 5 mm.

Of these three, only the slurry alkylate could be hydrocracked with no apparent decline in catalyst activity. At 1,500 p.s.i.g., 2.5 LHSV, and 750° F., after hydrocracking 90 catalyst volumes of the slurry alkylate, the conversion was 98%. Previous work indicated very little activity decline with the slurry catalyst in 400–500 vol./vol. However at the same conditions, with the high-temperature liquid sulfuric acid alkylate, the conversion rapidly declined below 85% after only 25–30 vol./vol. Alkylation at a lower temperature and conversion vastly improved the hydrocracking properties of the alkylate. At 500 p.s.i.g., 2.5 LHSV, and 750° F., the conversion declined slowly to below 85% after 250 vol./vol. The slurry alkylate could also be processed at a pressure as low as 500 p.s.i.g. with no apparent decline in catalyst activity after 25–30 vol./vol. The hydrocracking results are summarized in Table 3.

Table 3.—Summary of Hydrocracking

[2.5 LHSV, 1,500 p.s.i.g., 750° F., 4/1 H₂/alkylate]

| Alkylate | Conversion After 25-30 Catalyst Volumes of Alkylate, Percent | Heavy Ends,ᵃ percent |
| --- | --- | --- |
| High-Temp. Liquid H₂SO₄ | <85 | 8.2 |
| High-Temp. Liquid H₂SO₄ (Caustic Washed) | <85 | |
| Low-Temp. Liquid H₂SO₄ | 9.95 | 3.0 |
| Low-Temp. Liquid H₂SO₄ (Contaimnated) | <85 | 3.4 |
| Low-Temp. Liquid H₂SO₄ (Contaminated), Clay-treated | 99 | 0.8 |
| Slurry | 98.5 | 0.7 |

ᵃ Boiling >300° C. at 5 mm.

Various treatments were used to remove heavy ends from the liquid sulfuric acid alkylates in order to make them comparable to the slurry alkylate in hydrocracking performance. The low-temperature, low-conversion liquid sulfuric acid alkylate was contaminated with the high-temperature, high-conversion alkylate and hydrocracked poorly. However, treatment of this unstabilized contaminated low-temperature alkylate over Attapulgus clay at 1 LHSV and 125° C. removed about 80% of the heavy ends, and this clay-treated alkylate then hydrocracked with no apparent decline in catalyst activity. Arsenic, a corrosion-inhibitor in the liquid sulfuric acid alkylation, was suspected as a catalyst poison but after removing the arsenic from alkylate by caustic, the catalyst still declined rapidly in activity (Table 3).

We claim as our invention:

1. Process for the addition of a methyl group to an alkylbenzene to form a corresponding methyl alkylbenzene which comprises contacting an alkylbenzene with formaldehyde in the presence of a strong liquid acid catalyst selected from the group consisting of sulfuric, phosphoric, toluenesulfonic, trichloroacetic, and methane sulfonic acids to form a product comprising essentially diarylmethanes and containing high-boiling contaminants other than triaryldimethanes and tetraaryltrimethanes, contacting at least a portion of said product with a non-isomerizing porous adsorbent material at a temperature between about 125° C. and about 250° C. to remove said contaminants whereby a substantial amount of said contaminants are adsorbed by said adsorbent material and an unadsorbed product portion remains, separating said adsorbent and contaminants adsorbed thereon from said unadsorbed product portion, and hydrocracking said product portion at an elevated temperature under hydrogenating conditions in the presence of hydrogen and of a high-melting essentially neutral inorganic substance having hydrogenating activity, to form the corresponding methyl alkylbenzene.

2. Process in accordance with claim 1 wherein said porous adsorbent material is selected from the group consisting of activated alumina, bauxite, montmorillinitic clays, and silica gel.

3. A process according to claim 1 in which said porous adsorbent is alumina.

4. A process according to claim 1 in which said porous adsorbent is clay.

5. A process according to claim 1 wherein the contacting temperature over the porous adsorbent material is between about 125° C. and 250° C.

6. A process according to claim 1 in which said contact of alkylbenzene and formaldehyde is carried out at a temperature above about 143° C.

7. Process in accordance with claim 1 wherein toluene is contacted with the formaldehyde and para-xylene is the corresponding methyl alkylbenzene formed.

8. Process in accordance with claim 1 wherein pseudocumene is alkylated with formaldehyde and durene is the corresponding methyl alkylbenzene formed.

9. Process in accordance with claim 1 wherein the strong liquid acid catalyst is sulfuric acid.

References Cited in the file of this patent

UNITED STATES PATENTS

| 2,700,690 | Mottern | Jan. 25, 1955 |
| 2,854,493 | Fetterly et al. | Sept. 30, 1958 |
| 2,920,117 | Hendrickson | July 5, 1960 |